June 5, 1962  R. N. CROSS  3,037,398
BRAKE SLACK ADJUSTMENT
Filed June 30, 1958
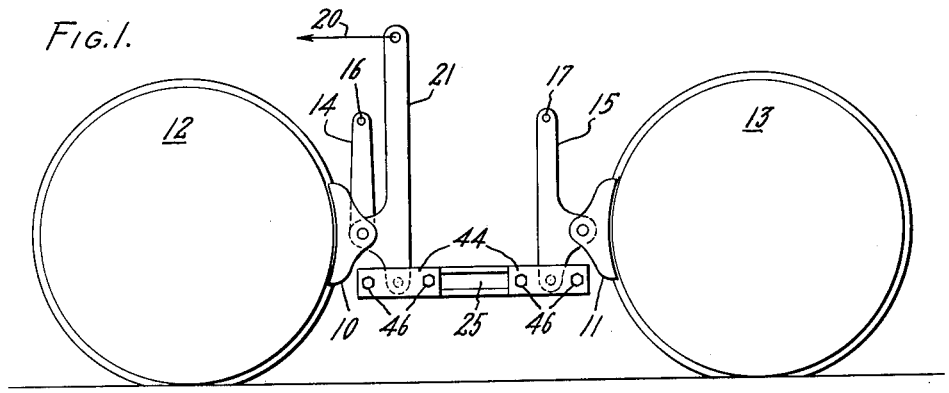
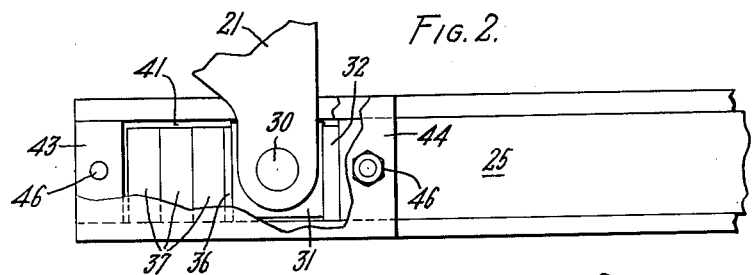
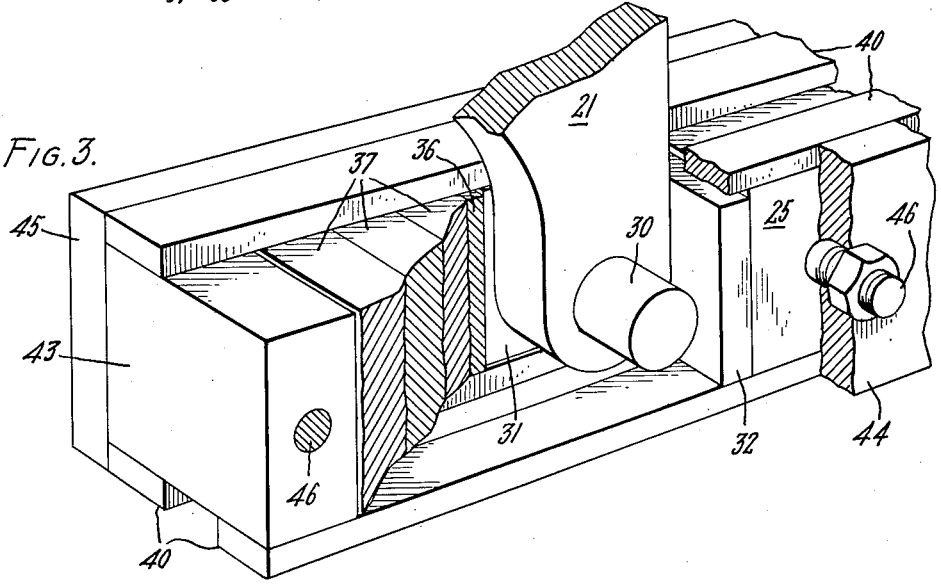
Inventor
Richard N. Cross
by David P. Ogden
His Attorney

United States Patent Office 3,037,398
Patented June 5, 1962

3,037,398
BRAKE SLACK ADJUSTMENT
Richard N. Cross, Erie, Pa., assignor to General Electric Company, a corporation of New York
Filed June 30, 1958, Ser. No. 745,420
5 Claims. (Cl. 74—586)

My invention relates to an improvement in brake slack adjustment, and, more particularly, to a new arrangement for varying the length of a compression link of a locomotive brake linkage.

It is well known by those familiar with the railroad art that wheel surfaces, brake shoes, and lever connection pivots will wear sufficiently to prevent proper operation of the braking shoes in response to air pressure. This wear, which may be as great as 3 inches on the wheel surfaces alone, requires periodic adjustment of the linkage system for safe, controllable operation of the brakes. In the past, several methods of adjusting the brake linkage slack mechanisms have been attempted.

For instance, a turn-buckle or threaded type adjustment has been used in the brake compression link to adjust the same and compensate for any wear in the system. However, it often occurs that with the turn-buckle or threaded member being exposed to the elements, including sand, wind, rain, etc., sufficient rust and corrosion occur between the threaded members to prevent relative movement thereof so that frequent replacement of a relatively expensive part is necessary to adjust for brake rigging wear.

Another type of slack adjustment is the use of a multiple hole compression link wherein bolts passing through various pairs of spaced holes can be made to control the length of the compression bar in increments of an inch or more. However, such an arrangement is also subject to maintenance difficulties. Moreover, this arrangement is awkward to use and at best gives a very coarse adjustment.

A further method that has been attempted is the use of a pair of members having mating serrated surfaces which are clamped together. This type of arrangement has not been accepted by the industry partially because of the expense of making the serrated compression bar and partially because of the fact that rust and contamination inhibit adjustment of the length of such a rod.

Another type of slack adjustment of a compression lever or element which has been proposed is the use of a device wherein shims will automatically drop in place behind a thrust element at any time sufficient slack is available for the lowering of a shim. This particular device is subject to rust so that the automatic dropping of the shims becomes unlikely and, furthermore, is objectionable because of the fact that each of the shims must be of a similar thickness. This problem requires the use of a large number of thin shims or, with fewer shims, a shim thickness which makes the adjustment very coarse. As a practical matter, the use of the automatic shim slack adjustment has been very limited because of the difficulty in maintenance.

Therefore, an object of my invention is to provide a simple and inexpensive means of obtaining both the coarse and fine adjustment of the length of the compression link of a brake rigging system.

In carrying out my invention in one form, a compression link is provided with guideways which support a plurality of shims at each end with the location of the shims controlling the distance between the brake shoes. By way of example, each end of the compression link is provided with guideways for five shims. Three of the shims at each end have a thickness of 1 inch; one of the shims at each end has a thickness of ½ inch; and one of the shims at each end is ¼ inch thick. Thus, it becomes readily apparent that the length of the compression link may be varied as much as 7½ inches in increments of ¼ inch by moving shims from one side to the other of a brake shoe support link connection.

The subject matter which I regard as my invention is clearly pointed out and distinctly claimed in the concluding portion of this specification. My invention, however, as to its organization and method of operation together with further objects and advantages thereof will best be understood by reference to the following description taken in connection with the accompanying drawing, in which:

FIG. 1 is a side plan view of the brake linkage elements affecting directly the compression of a compression link;

FIG. 2 is a detail view partially in section of one end of the compression link shown in FIG. 1; and FIG. 3 is a perspective view partially broken away of the detail view shown in FIG. 2.

Referring now to the drawing, in which like numerals indicate similar parts, in FIG. 1, I have shown a pair of brake shoes 10 and 11 adapted to engage and retard rotation of the running surfaces of the rail wheels 12 and 13 respectively. The brake shoes 10 and 11 are supported from a railway truck (not shown) by swing links 14 and 15 which are pivotably mounted on the truck at points 16 and 17 respectively.

In order that a braking force vector 20 may be caused to increase the distance between the brake shoes 10 and 11, a braking link or lever 21 is connected therebetween whereby the braking force vector 20 will cause counterclockwise rotation of the lever 21. This rotation will cause both an increase of the distance between brake shoes 10 and 11, and a compression of the compression link 25. It is obvious that the link 15 operates, during brake application, as a lever of the brake linkage. It is well known in this art that the leverage of the link 15 and the lever 21 may be designed with leverage ratio which will cause substantially equal pressures between the brake shoes 10 and 11 and the surfaces of the wheels 12 and 13 respectively.

Referring now to FIG. 2, I have shown a detail view partially in section of one end of the compression link 25. As the braking force vector 20 is applied to the lever 21, compression occurs between the lever 21, a pivot pin 30 and the end of the compression link 25. This pressure is transmitted to a pair of bearing members 31 and through a shim 32 to the compression link 25. Other shims 36 and 37 are stored adjacent to the bearing members 31.

In the particular construction shown in FIG. 2, the shim 32 is ½ inch thick, the shim 36 is ¼ inch thick, and the shims 37 are 1 inch thick. These shims are supported on guide members 40 which are welded to the compression link 25. The end of the cavity 41 containing the bearing members 31 and the shims 32, 36 and 37 has a plate 43 welded to the guide members 40 to prevent longitudinal loss of the stored shims, and to increase the useful strength of the guide members 40. It should be noted that the shims 32—37 are somewhat smaller than the compression bar 25 and the plate 43 whereby they may be moved easily and may be removed laterally even if there is a substantial amount of rust in the cavity 41.

The particular construction, using the combination of the compression link 25 and the guides 40 welded thereto, eliminates any cutting of the compression link to provide a cavity 41 for the shims. This construction is often referred to as chipless construction and is generally considered more economical than any method of construction requiring cutting of steel beams. Obviously, the compression link 25 could have been enlarged to overall dimensions great enough to allow the removal of sufficient material to define the cavity 41 instead of the welding of the guide members 40 to the compression link 25 and the plate 43.

Referring now to FIG. 3 where I have shown a perspective view of one end of the compression link 25 with one of the side cover plates 44 partially broken away and one of the bearing members 31 removed, the overall construction is easily envisioned. The shims are prevented from moving vertically by the guide members 40 and are prevented from moving laterally by the removable guide plates 44 and 45 which are secured by bolts 46 to the end of the compression link and the plate 43 to substantially enclose the shim cavity 41. Longitudinal movement of the shims is prevented by the plate 43 and the compression link 25.

Since the compressional strength of the slack adjustment arrangement depends only on compression between the pivot pin 30 and the compression link 25, a maximum strength required of the guide members 40 is to support the weight of the compression link 25 assembly. The bending moment and compression forces resulting in the slack adjustment members from the braking force vector 20 will stress only the compression link 25 and any shims between the compression link 25 and the bearing members 31. However, in a clasp type brake rigging, the slack adjustment would normally occur in a tensioned link whereby the guide members 40 should have a combined tensile strength sufficient to withstand any reaction forces caused by the braking force vector 20.

According to my invention, both fine and coarse adjustments can be made with this shimming arrangement by simply disconnecting the bolts 46, and removing the side cover plates 44 and 45 to rearrange the shims 32, 36 and 37 within the shim cavity 41. For instance, one ½ inch shim 32 may be replaced by one of the 1 inch shims 37. Thus, the effective length of the compression link 25 would be increased by ½ inch. With the 1 inch elongation desired, a similar change could be made at both ends of the compression link 25. With a 1¼ inch increase desired, one 1 inch link shim 37 can be placed in between the bearing material and the compression link 25 at one end and the shims 37 and 36 may be used in the other end. Obviously, with this arrangement, any combination of shims in increments of ¼ inch may be obtained to control the length of the compression link.

Actually, the variation of ¼ inch of the compression link 25 will cause slightly less than ¼ inch variation of the spacing of the brake shoes 10 and 11 because of the relative leverage of the parts. Thus, with a ratio of approximately 3:1 of the vertical distance between the application of the braking force vector 20 to the support of the brake shoe and to support of the brake to the pivot pin 30, a ¼ inch variation of the length of the compression link 25 will cause about 3/16 inch variation of the distance between the brake shoes 10 and 11.

While I have shown and described a particular embodiment of my invention, other modifications will occur to those skilled in the art. For instance, my slack adjustment is adaptable to any brake rigging of the single shoe type or the clasp type wherein the link equivalent to the compression link 25 might be a tension link. With some of the single shoe brake riggings, the link 15 may be replaced by a rigid pivotal connection. Moreover, the end of the lever 21 engaging the pivot pin 30 could be of a bifurcated construction whereby only one pivot pin bearing member 31 and only two guide members 40 would be required. Therefore, I intend by the appended claims to cover all such modifications as fall within the true spirit and scope of my invention.

What I claim as new and desire to secure by Letters Patent of the United States is:

1. A slack adjuster for use in railway vehicle brake rigging comprising, a member defining a longitudinal cavity adjacent one end thereof and having a fixed length portion intermediate the cavity and the opposite end thereof, a force-transmitting bearing member in the cavity longitudinally positionable therein, a plurality of selected thickness shims removably carried within the cavity, each of said shims arranged to be independently and selectively positioned in said cavity on either side of said bearing member to longitudinally position said bearing member in the cavity to vary the length between said bearing member and the opposite end of said slack adjuster and means removably fastened to said first named member for retaining said shims in the cavity.

2. A slack adjuster for use in railway vehicle brake rigging comprising, a member defining a longitudinal cavity adjacent one end thereof and having a fixed length portion intermediate the cavity and the opposite end thereof, a force-transmitting bearing member in the cavity longitudinally positionable therein, a plurality of shims of selected non-uniform thickness removably carried within the cavity, each of said shims arranged to be independently and selectively positioned in said cavity on either side of said bearing member to longitudinally position said bearing member in the cavity to vary the length between said bearing member and the opposite end of said slack adjuster and means removably fastened to said first named member for retaining said shims in the cavity.

3. A slack adjuster for use in railway vehicle brake rigging comprising, a member defining a longitudinal cavity adjacent one end thereof and having a fixed length portion intermediate the cavity and the opposite end thereof, a force-transmitting bearing member in the cavity longitudinally positionable therein, a plurality of shims of selected thickness removably carried within the cavity, each of said shims arranged to be independently and selectively positioned in said cavity on either side of said bearing member to longitudinally position said bearing member in the cavity to vary the length between said bearing member and the opposite end of said slack adjuster, and means removably fastened to said first named member for retaining said shims in the cavity.

4. An adjustable length brake rod for use in railway vehicle brake rigging adapted to interconnect two brake levers and transmit force therebetween comprising, a link member defining a longitudinal cavity adjacent one end thereof and having a fixed length portion intermediate the cavity and the opposite end thereof, a bearing member longitudinally moveable in the cavity, said bearing member adapted to be pivotally supported on one of the levers, the opposite end of said link member being adapted to be pivotally supported by the second brake lever to interconnect the levers, shims of selected non-uniform width removably carried in the cavity, each shim adapted to be independently and selectively positioned on either side of said bearing member in the cavity to longitudinally position said bearing member in the cavity to determine the effective length of said brake rod between the brake levers and means removably fastened to said link member for retaining the shims in the cavity.

5. An adjustable length brake rod for use in railway vehicle brake rigging adapted to interconnect two brake levers and transmit force therebetween comprising, a link member defining a longitudinal cavity adjacent the ends thereof and having a fixed length portion intermediate the cavities, a bearing member longitudinally moveable in each cavity, each of said bearing members adapted to be pivotally supported on one of the levers to interconnect the levers, shims of selected non-uniform width removably carried in the cavities, each shims adapted to be independently and selectively positioned on either side of the bearing member in the respective cavities to determine the effective length of said brake rod and means removably fastened to said link member adjacent the cavities for retaining said shims in the cavities.

(References on following page)

References Cited in the file of this patent

UNITED STATES PATENTS

| | | |
|---|---|---|
| 550,045 | Goughnour | Nov. 19, 1895 |
| 935,176 | Thompson | Sept. 28, 1909 |
| 996,823 | Zink | July 4, 1911 |
| 1,158,177 | Christenson | Oct. 26, 1915 |
| 1,184,682 | Christenson | May 23, 1916 |
| 1,184,683 | Christenson | May 23, 1916 |
| 1,275,865 | Everett | Aug. 6, 1918 |
| 1,527,296 | Dudas | Feb. 24, 1925 |
| 1,999,868 | Coultas | Apr. 30, 1935 |
| 2,155,820 | Eastburn et al. | Apr. 25, 1939 |
| 2,431,342 | Perkins | Nov. 25, 1947 |
| 2,468,707 | Simanek | Apr. 26, 1949 |
| 2,772,596 | Trussell | Dec. 4, 1956 |